W. A. PEARSON.
WIND SHIELD HINGE.
APPLICATION FILED SEPT. 16, 1911.
1,039,588.
Patented Sept. 24, 1912.
2 SHEETS—SHEET 2.
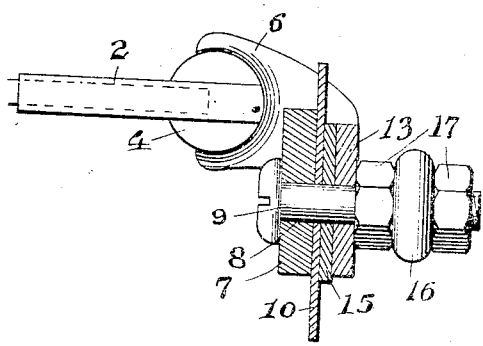
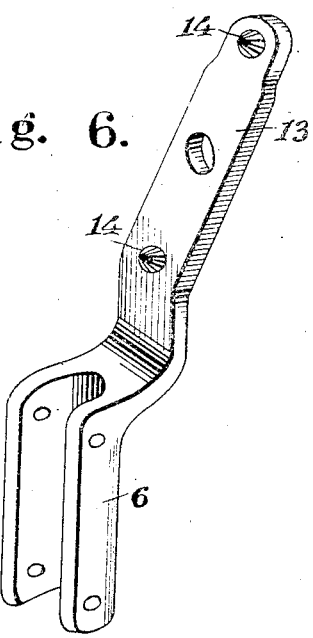
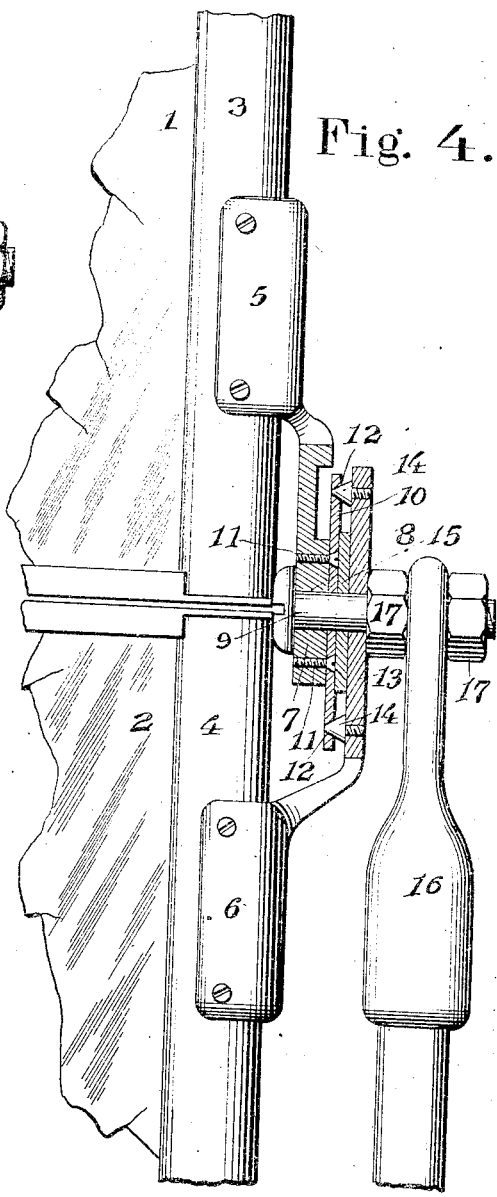
Witnesses
M. H. Garnett
Wm. J. North
Inventor
Willis A. Pearson
By Victor J. Evans
Attorney

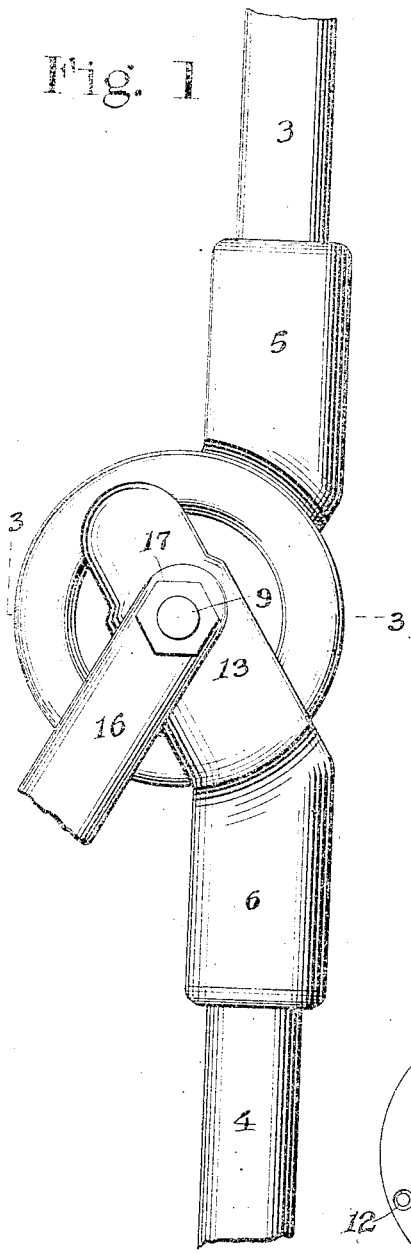
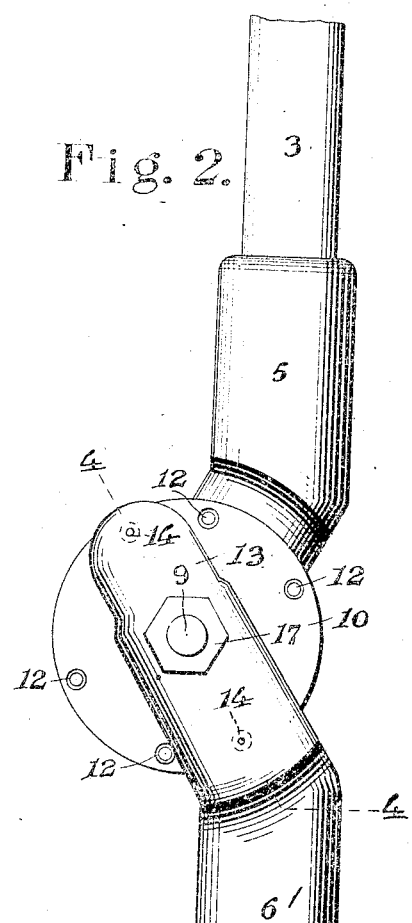
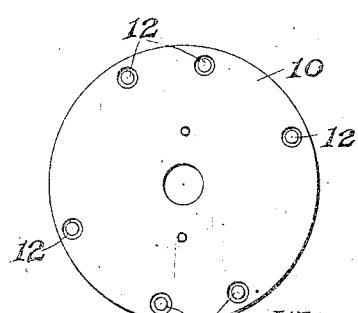

UNITED STATES PATENT OFFICE.

WILLIS A. PEARSON, OF TROY, OHIO.

WIND-SHIELD HINGE.

1,039,588. Specification of Letters Patent. Patented Sept. 24, 1912.

Application filed September 16, 1911. Serial No. 649,758.

*To all whom it may concern:*

Be it known that I, WILLIS A. PEARSON, a citizen of the United States, residing at Troy, in the county of Miami and State of Ohio, have invented new and useful Improvements in Wind-Shield Hinges, of which the following is a specification.

This invention relates to wind shields for automobiles, and particularly to hinges for the upper and lower sections of the shield.

In carrying out my invention it is my purpose to provide a hinge for sectional wind shields which provides means whereby the shield may be securely locked at different angles and sustained in such position irrespective of the movement of the automobile.

Another object of the invention is to provide a wind shield with a hinge which is simple in construction, composed of comparatively few parts, durable, and highly efficient for adjustably connecting the members of the wind shield to prevent the rattling of the said parts.

With the above recited objects, and others of a similar nature in view, the invention resides in the novel construction, combination and arrangement of parts set forth in and falling within the scope of the appended claim.

In the accompanying drawings,—Figure 1 is an elevation of one end of a wind shield showing the sections connected in accordance with the present invention. Fig. 2 is a side elevation of the same, the metal covering being removed. Fig. 3 is a detail sectional view upon the line 3—3 of Fig. 1. Fig. 4 is an enlarged sectional view taken upon the line 4—4 of Fig. 2. Fig. 5 is a detail view of the spring disk. Fig. 6 is a detail perspective view of the fitting which is connected with the lower section of the shield.

Referring now to the drawings, the numeral 1 designates the upper section of the wind shield, and 2 the lower section of the same. The shields 1 and 2 are of course constructed of glass, or some other transparent material, and have their outer edges provided with a suitable frame or casing designated by the numerals 3 and 4 respectively.

The numeral 5 designates the fitting for the upper section 1, and 6 the fitting for the lower section 2. These fittings comprise the hinged sections for the device, and the said fittings are connected with the frames 3 and 4 in any desired or preferred manner. The fitting 5 is centrally provided with a boss 7, the same being provided with an opening or passage 8 through which the bolt 9 of the hinge passes.

The numeral 10 designates a spring disk, the same being connected with the boss through the medium of screws 11, and the said disk is provided with a plurality of spaced openings 12.

The fitting 6 is formed with an off-set extension 13 which is provided with an opening through which the bolt 9 passes. This extension 13 is provided with a plurality of cone-shaped projections 14, the latter adapted to register with and to engage any of the openings 12 of the spring disk 10. The central portion of the disk 10 is sustained against the extension 13 of the fitting 6 through the medium of a friction washer 15, and the brace 16 is sustained upon the bolt 9 through the medium of spaced nuts 17. The disk 10 is adapted to exert a pressure toward the extension 13, of the member 6, and the said extension likewise exerts a pressure toward the disk. It will be noted, however, from the above description, when taken in connection with the drawings, that the section 3 of the shield may be rotated to a desired position and the openings in the disk 12 carried by the section 5 will receive the cone-shaped projections and sustain the section 3 of the wind shield at a desired position with relation to the section 2.

It is of course to be understood that the extensions of the fittings are provided with suitable coverings of spun metal, but in illustrating the device, these coverings have not been considered necessary to illustrate.

Having thus described the invention, what I claim is:—

A hinge for the purpose set forth comprising a pair of members, each being provided with offset extensions, each of the said extensions being provided with registering openings, a boss upon one of the members surrounding its opening, a resilient disk removably connected with the boss, said disk being formed with a plurality of concentrically arranged spaced substantially cone-shaped openings, a friction washer upon the pivot and arranged between the disk and the offset extension of the second section of the hinge, and the said second hinge section being provided with cone-shaped projections which are arranged in register with and adapted to engage within the cone-shaped openings of the disk.

In testimony whereof I affix my signature in presence of two witnesses.

WILLIS A. PEARSON.

Witnesses:
H. E. GOODRICH,
H. H. PEARSON.